United States Patent
Bergius et al.

(10) Patent No.: US 11,381,964 B2
(45) Date of Patent: Jul. 5, 2022

(54) CELLULAR NETWORK AUTHENTICATION CONTROL

(71) Applicant: Nokia Technologies Oy, Espoo (FI)

(72) Inventors: Hannu Bergius, Kangasala (FI); Silke Holtmanns, Klaukkala (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/309,673

(22) PCT Filed: May 20, 2014

(86) PCT No.: PCT/FI2014/050383
§ 371 (c)(1),
(2) Date: Nov. 8, 2016

(87) PCT Pub. No.: WO2015/177398
PCT Pub. Date: Nov. 26, 2015

(65) Prior Publication Data
US 2017/0150355 A1 May 25, 2017

(51) Int. Cl.
*H04L 9/00* (2022.01)
*H04W 12/06* (2021.01)
(Continued)

(52) U.S. Cl.
CPC .............. *H04W 12/06* (2013.01); *H04L 9/14* (2013.01); *H04L 9/3271* (2013.01); *H04L 63/06* (2013.01);
(Continued)

(58) Field of Classification Search
CPC ......... H04L 9/32; H04L 29/06; H04L 63/205; H04L 63/123; H04L 63/08; H04L 63/0892; H04L 63/20
(Continued)

(56) References Cited

U.S. PATENT DOCUMENTS

| 9,661,481 B2 * | 5/2017 | Osborn | H04W 4/14 |
| 2006/0026671 A1 * | 2/2006 | Potter | H04L 63/08 |
| | | | 726/7 |

(Continued)

FOREIGN PATENT DOCUMENTS

| EP | 2139175 A1 | 12/2009 |
| EP | 2187561 A1 | 5/2010 |

(Continued)

OTHER PUBLICATIONS

Extended European Search Report received for corresponding European Patent Application No. 14892516.7, dated Dec. 14, 2017, 6 pages.

(Continued)

*Primary Examiner* — Josnel Jeudy
(74) *Attorney, Agent, or Firm* — Harrington & Smith

(57) ABSTRACT

A cellular terminal detects any capability reporting trigger and responsively to such determination produces a cellular network authentication capabilities message indicative of cellular network authentication capabilities available for the terminal; and transmits the cellular network authentication capabilities message to the cellular network. The cellular network receives the network authentication capabilities message from a cellular terminal, selects a cellular authentication algorithm based on capabilities indicated by the network authentication capabilities message; and performs cellular authentication with the cellular terminal using the selected cellular authentication algorithm.

19 Claims, 2 Drawing Sheets

(51) Int. Cl.
*H04L 9/32* (2006.01)
*H04L 9/40* (2022.01)
*H04L 9/14* (2006.01)

(52) U.S. Cl.
CPC .......... *H04L 63/083* (2013.01); *H04L 63/205* (2013.01); *H04L 2209/80* (2013.01)

(58) Field of Classification Search
USPC ........................................................ 380/247
See application file for complete search history.

(56) References Cited

U.S. PATENT DOCUMENTS

| | | | |
|---|---|---|---|
| 2008/0141031 A1 | 6/2008 | Oba et al. | |
| 2009/0119509 A1 | 5/2009 | Cho et al. | |
| 2010/0064135 A1* | 3/2010 | Thakare | H04W 12/06 713/156 |
| 2010/0203865 A1* | 8/2010 | Horn | H04W 48/16 455/411 |
| 2010/0275249 A1* | 10/2010 | McCann | H04W 12/068 726/5 |
| 2010/0311419 A1* | 12/2010 | Bi | H04W 60/00 455/435.1 |
| 2011/0191842 A1* | 8/2011 | Lindholm | H04W 12/041 726/9 |
| 2011/0280228 A1* | 11/2011 | McCann | H04W 48/14 370/338 |
| 2012/0076117 A1* | 3/2012 | Montemurro | H04W 48/16 370/338 |
| 2013/0165073 A1 | 6/2013 | Madsen | |
| 2013/0331063 A1 | 12/2013 | Cormier et al. | |
| 2018/0020347 A1* | 1/2018 | Palanigounder | H04W 12/068 |

FOREIGN PATENT DOCUMENTS

| | | |
|---|---|---|
| WO | 2005/032201 A1 | 4/2005 |
| WO | WO-2008/092999 A1 | 8/2008 |
| WO | 2010/027314 A1 | 3/2010 |
| WO | 2013/036009 A1 | 3/2013 |
| WO | 2014/032570 A1 | 3/2014 |

OTHER PUBLICATIONS

"Comments on S3-131066 (attachment), TUAK Algorithm Set, Document 1: Algorithm Specification", 3GPP TSG SA WG3 (Security) Meeting #73, S3-131104, Agenda Item: 7.15, Nokia, Nov. 11-15, 2013, 31 pages.
"3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 12)", 3GPP TS 29.272, V12.0.0, Mar. 2013, pp. 1-122.
"3rd Generation Partnership Project; Technical Specification Group Core Network and Terminals; Cx and Dx interfaces based on the Diameter protocol; Protocol details (Release 12)", 3GPP TS 29.229, V12.1.0, Dec. 2013, pp. 1-37.
"3rd Generation Partnership Project; Technical Specification Group Core Network and Terminals; Non-Access-Stratum (NAS) protocol for Evolved Packet System (EPS); Stage 3 (Release 12)", 3GPP TS 24.301, V12.2.0, Sep. 2013, pp. 1-352.
"3rd Generation Partnership Project;Technical Specification Group Core Network and Terminals;Mobile radio interface Layer 3 specification; Core network protocols; Stage 3 (Release 12)", 3GPP TS 24.008, V12.3.0, Sep. 2013, pp. 1-683.
"3rd Generation Partnership Project; Technical Specification Group Services and System Aspects; Specification of the TUAK Algorithm Set: A Second Example Algorithm Set for the 3GPP Authentication and Key Generation Functions f1*, f2, f3, f4, f5 and f5*; Document 1: Algorithm Specification (Release 12)", 3GPP TS 35.231, V12.0.1, Dec. 2013, pp. 1-27.
International Search Report and Written Opinion received for corresponding Patent Cooperation Treaty Application No. PCT/FI2014/050383, dated Jan. 29, 2015, 17 pages.
"3rd Generation Partnership Project; Technical Specification Group Services and System Aspects; 3G Security; Security architecture (Release 12)", 3GPP TS 33.102, V12.0.0, Mar. 2014, pp. 1-76.

* cited by examiner

CELLULAR NETWORK AUTHENTICATION CONTROL

RELATED APPLICATION

This application was originally filed as PCT Application No. PCT/FI2014/050383 filed May 20, 2014.

TECHNICAL FIELD

The present application generally relates to cellular network authentication control.

BACKGROUND

This section illustrates useful background information without admission of any technique described herein representative of the state of the art.

Cellular telecommunications networks or cellular networks are ubiquitous in modern societies. As a necessary condition, they need to be secured to avoid phone bill frauds and to secure communications against illegal interception of private calls and messages. To this end, telecommunications operators of modern cellular networks protect their subscribers with a host of different techniques that typically rely on digital signal processing.

To enable a cellular terminal to start communications, the terminals need to attach to a network in a network attach process. In the network registration process, a cellular terminal exchanges signals to authenticate itself or more accurately its subscription, typically using a subscriber identity module (SIM). In the network attach or registration process, the cellular terminal obtains from the network and the SIM access information such as a session key with which the cellular terminal can subsequently communicate in the cellular network. The access information typically changes to prevent re-use of the access information by a possible illegal interceptor.

Encryption is a basic tool that is employed also in other types of digital cellular systems. Already GSM enabled encryption to practically prevent illegal interception. The development of computer technology has subsequently made old encryption techniques more vulnerable, but also helped to enhance the security techniques used in cellular systems. For instance, wide-band CDMA (W-CDMA) was designed for stronger security by enabling also the network to authenticate itself to the cellular terminals. In the W-CDMA, the subscriber identity is provided by a Universal Integrated Circuit Card (UICC) that runs a Universal Subscriber Identity Module (USIM). The USIM produces e.g. a session key based on a shared secret stored on the UICC, challenge and replay attack prevention codes received from the network and cryptographic algorithm that is enhanced over the one used in GSM. Also the authentication signaling is enhanced in the W-CDMA over GSM e.g. for protection against some man-in-the-middle attacks.

In parallel with the development of security methods for securing the communications in the cellular systems, there are also growing needs for developing the security structure of cellular terminals. At present, most cellular terminals contain an identity module slot known as a SIM slot in which a user can place and replace an identity module card (e.g. UICC). There is also development towards software based identity modules that are not physically replaceable and in addition enable over-the-air change of subscription from one operator to another. The embedded form factor prevents theft of the identity module from a cellular terminal. The terminals with embedded secure modules are often unattended machines. Such software identity modules may be very useful e.g. for built-in vehicular communication systems so that their emergency reporting capabilities and possible burglar control systems could not be easily deactivated by removing a SIM.

While necessary for security, the authentication signaling unfortunately delays completion of a network attach procedures. Moreover, the inventors have now identified that in some particular combinations of cellular terminal equipment, network configuration and encryption authentication protocols, a cellular terminal might engage into a perpetually failing loop so that its user could not establish telecommunications connectivity at all.

SUMMARY

Various aspects of examples of the invention are set out in the claims.

According to a first example aspect of the present invention, there is provided a method in a cellular terminal comprising:

detecting any capability reporting trigger and responsively to such determination:

producing a cellular network authentication capabilities message indicative of cellular network authentication capabilities available for the terminal; and transmitting the cellular network authentication capabilities message to the cellular network.

It may be a capability reporting trigger that the cellular terminal is about to send one or more of: an attach request message; a tracking area update request; and a routing area update request.

The method may comprise receiving from the cellular network a capability request message for authentication capabilities. The receiving of the capability request message may form a capability reporting trigger.

The cellular terminal may comprise a security entity. The security entity may comprise a secure element. The security entity may comprise a subscriber identity module application. The cellular terminal may comprise user equipment. The user equipment may be configured to perform communications over radio interface with a base station. The security entity may be configured to computation of authentication key management for cellular authentication.

The user equipment may be selected from a group consisting of: a mobile terminal; a laptop computer; a vehicle; a car; a car key; a portable device; a handheld electronic device; and a single or multifunction device with cellular radio capability. The secure element may be removable or embedded or integrated in an existing processor architecture (e.g. baseband circuitry, main processor, central processing unit, and/or master control unit).

The security entity may be configured to form content for the capabilities message. The security entity may be configured to receive a request for the content for the capabilities message and to responsively produce the content for the capabilities message. The security entity may be configured to receive an authentication request and to respectively produce the content for the capabilities message.

The cellular terminal may comprise a processor configured to control operations of the cellular terminal.

The security entity may be a software-based entity. The security entity may comprise a processor that is configured to operate independently from the processor of the cellular terminal. The security entity may be contained in an integrated circuit. The security entity may be contained in an universal integrated circuit card, UICC or SoC (system on chip), TPM (trusted platform module), TCM (trusted computing module), trusted element or a virtual secure element as part of the baseband chip. The security entity may be contained in an embedded universal integrated circuit card, eUICC.

The processor of the cellular terminal may be configured to perform authentication related communications in a non-access stratum, NAS, layer.

The cellular terminal may be configured to receive an update command and to responsively update the security entity. The cellular terminal may be configured to update the security entity to support an earlier unsupported cellular authentication algorithm.

The capabilities message may be contained within another cellular network authentication message that is produced by the cellular terminal for the cellular network. The capabilities message may be conveyed using a set of bits of an authentication management field, AMF, in an authentication token, AUTN.

The capabilities message may be contained within an authentication failure message.

The capabilities message may be contained within an authentication response message.

The cellular terminal may be configured to support any one or more of a plurality of cryptographic algorithms for the cellular authentication.

The cryptographic algorithms may be selected from a group consisting of MILENAGE; 128 bit TUAK; and 256 bit TUAK. The TUAK may refer to an algorithm set that complies with 3GPP TS 35.231 v. 12.0.1. The TUAK may be configured to employ AES cryptography. The TUAK may be based on Keccak permutation.

The authentication capabilities message may comprise an indication for whether the cellular terminal supports any one or more of: MILENAGE; 128 bit TUAK; and 256 bit TUAK.

According to a second example aspect of the present invention, there is provided a method in a cellular network comprising:

receiving cellular network authentication capabilities message from a cellular terminal;

selecting a cellular authentication algorithm based on capabilities indicated by the network authentication capabilities message; and performing cellular authentication with the cellular terminal using the selected cellular authentication algorithm.

The method may comprise maintaining a subscriber database. The subscriber database may be updated based on the network authentication message. The subscriber database may be a home location register.

The cellular network may be configured to receive the network authentication capabilities message from a non-access stratum, NAS, layer.

The cellular network may be configured to detect if the cellular terminal's cryptographic capabilities should be updated. The cellular network may be configured to detect that the cellular terminal's cryptographic capabilities should be updated if the cellular terminal is not capable of operating using a cryptographic algorithm that it should support and for which there is an update that is compatible with the cellular terminal. The cellular network may be configured to send to the cellular terminal an update command to cause updating of the security entity. The cellular network may be configured to update the subscriber database on updating of the cryptographic capabilities of the cellular terminal.

The capabilities message may be contained within another cellular network authentication message that is produced by the cellular terminal for the cellular network. The capabilities message may be conveyed using a set of bits of an authentication management field, AMF, in an authentication token, AUTN.

The authentication token may comprise 128 bits, 192 bits, 256 bits or 320 bits. The authentication token may consist of 128 bits, 192 bits, 256 bits or 320 bits. In case that the authentication token is more than 256 bits, excess bits may be discarded.

The authentication token may comprise a sequence number, SQN. The sequence number may consist of 48 bits.

The authentication token may comprise an anonymity key, AK. The anonymity key may consist of 48 bits.

The authentication token may comprise an authentication management field, AMF. The authentication management field may consist of 16 bits. The authentication management field may comprise 7 spare bits. The spare bits may be used to indicate cryptography adaptation information. The cryptography adaptation information may comprise lengths of different cryptography parameters.

The authentication token may comprise a challenge, RAND. The challenge may consist of 128 bits.

The cellular authentication may employ a cipher key, OK. The cipher key may consist of 64 bits, 128 bits or 256 bits.

The cellular authentication may employ an integrity key, IK. The integrity key may consist of 64 bits, 128 bits or 256 bits.

The cellular authentication may employ a response parameter, RES. The response parameter may consist of 32 bits, 64 bits, 128 bits or 256 bits.

The capabilities message may be contained within an authentication failure message.

The capabilities message may be contained within an authentication response message.

The cellular network may be configured to support any one or more of a plurality of cryptographic algorithms for the cellular authentication.

The cryptographic algorithms may be selected from a group consisting of MILENAGE; 128 bit TUAK; and 256 bit TUAK. The TUAK may refer to an algorithm set that complies with 3GPP TS 35.231 v. 12.0.1. The TUAK may be configured to employ AES cryptography. The TUAK may be based on Keccak permutation.

The authentication capabilities message may comprise an indication for whether the cellular terminal supports any one or more of: MILENAGE; 128 bit TUAK; and 256 bit TUAK.

According to a third example aspect of the present invention, there is provided an apparatus comprising means for performing the method of the first or second example aspect.

According to a fourth example aspect there is provided an apparatus comprising a processor configured to perform the method of the first or second example aspect.

According to a fifth example aspect there is provided an apparatus comprising at least one processor and at least one memory including computer program code; the at least one memory and the computer program code configured to, with the at least one processor, cause the apparatus to perform at least the method of the first or second example aspect.

According to a sixth example aspect there is provided a computer program comprising code for performing the method of the first or second example aspect.

According to a seventh example aspect there is provided a computer readable memory medium comprising the computer program of the sixth example aspect.

Any foregoing memory medium may comprise a digital data storage such as a data disc or diskette, optical storage, magnetic storage, holographic storage, opto-magnetic storage, phase-change memory, resistive random access memory, magnetic random access memory, solid-electrolyte memory, ferroelectric random access memory, organic memory or polymer memory. The memory medium may be formed into a device without other substantial functions than storing memory or it may be formed as part of a device with other functions, including but not limited to a memory of a computer, a chip set, and a sub assembly of an electronic device.

Different non-binding example aspects and embodiments of the present invention have been illustrated in the foregoing. The embodiments in the foregoing are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

An example embodiment of the present invention and its potential advantages are understood by referring to FIGS. 1 through 4 of the drawings. In this document, like reference signs denote like parts or steps.

Figure 1:
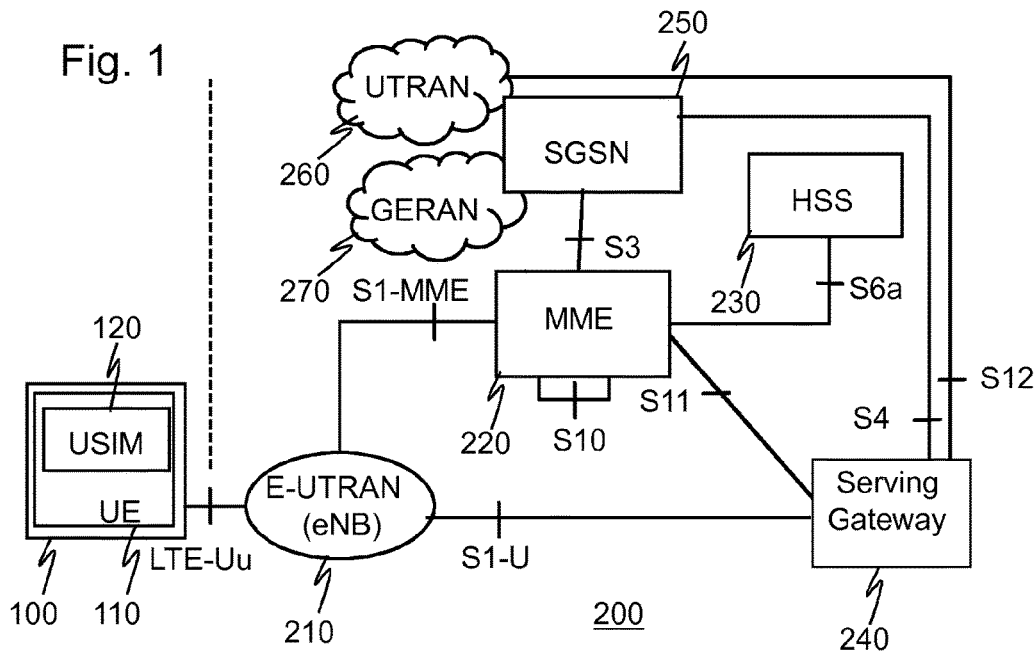
FIG. 1 shows an architectural drawing of a system of an example embodiment.

FIG. 1 an architectural drawing of a system of an example embodiment. A cellular terminal 100 is drawn with user equipment 110 and a security entity such as a secure element. The security entity may contain a USIM 120. In an example embodiment, the USIM is an application on a software implemented security element. In an example embodiment, the security entity is a software-based entity. In an example embodiment, the security entity comprises a processor that is configured to operate independently from the processor of the cellular terminal. In an example embodiment, the security entity is contained in an integrated circuit. In an example embodiment, the security entity is contained in an universal integrated circuit card, UICC or system on chip (SoC), trusted platform module (TPM), trusted computing module (TCM), trusted element or a virtual secure element as part of the baseband chip or main processor. In an example embodiment, the security entity is contained in an embedded universal integrated circuit card (eUICC).

The system further comprises a cellular telecommunication network 200 that comprises an E-UTRAN or eNB 210, a mobility management entity MME 220, a home subscriber server, HSS 230 (e.g. home location register HLR, authentication center AuC), a serving gateway 240, a serving gateway support node, SGSN 250, a Universal Terrestrial Radio Access Network, UTRAN 260 and a GSM EDGE Radio Access Network, GERAN 270.

Figure 2:
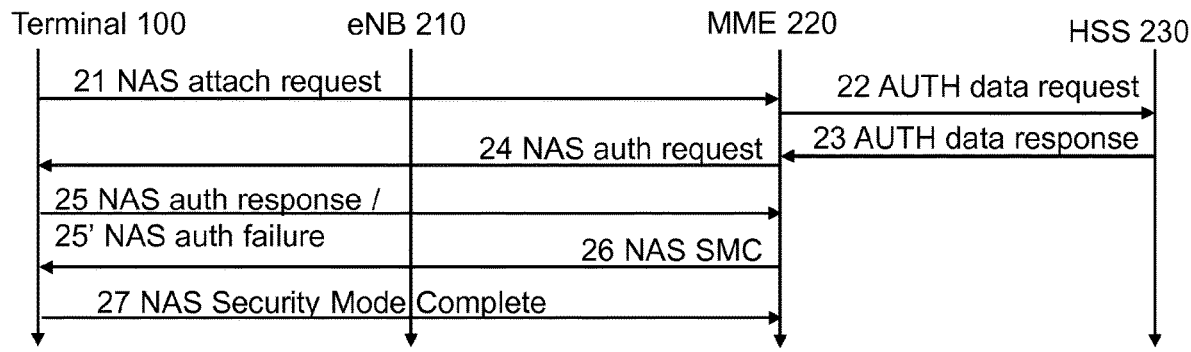
FIG. 2 shows a flow chart of a process of an example embodiment.

FIG. 2 shows a flow chart of a process of an example embodiment. In step 21, the cellular terminal sends a non-access stratum (NAS) attach request or network registration request to the MME 220 via the eNB 210. The MME 220 requests 22 authentication data (e.g. an authentication quintet) from the HSS 230 and responsively receives 23 an authentication data response with the requested authentication data. The MME 220 then sends 24 an NAS authentication request to the terminal 100 that replies 25 with an NAS authentication response if the terminal 100 is capable of decoding the NAS authentication request and to produce the NAS authentication response. To this end, the terminal 100 has to support the authentication algorithm used by the MME and possess a shared secret that is known by the HSS 230 and the terminal 100. If the terminal 100 fails to decode the NAS authentication request, the terminal 100 replies 25' with a NAS authentication failure.

After successful decoding of the NAS authentication request and the responsive NAS authentication response, the MME sends 26 to the terminal 100 a NAS security mode completion message and the terminal 100 replies 27 with a corresponding NAS security mode complete message. In another example embodiment, either or both the NAS security mode completion and NAS security mode complete reply is/are omitted or substituted by one or more other signals or messages.

The various messages of FIG. 2 and their processing can be implemented in a large variety of different ways.

In an example embodiment, the process of FIG. 2 starts from another request that requires authentication procedure triggering such as a tracking area update request or a routing area request to the cellular network 200 instead of the network registration request.

In an example embodiment, the authentication request message 24 comprises an indication of a selected cryptographic algorithm from a group of a plurality of cryptographic algorithms. In an example embodiment, the cryptographic algorithms are selected from a group consisting of MILENAGE; 128 bit TUAK; and 256 bit TUAK. The TUAK may refer to an algorithm set that complies with 3GPP TS 35.231 v. 12.0.1. The TUAK may be configured to employ AES cryptography. The TUAK may be based on Keccak permutation.

Figure 3:
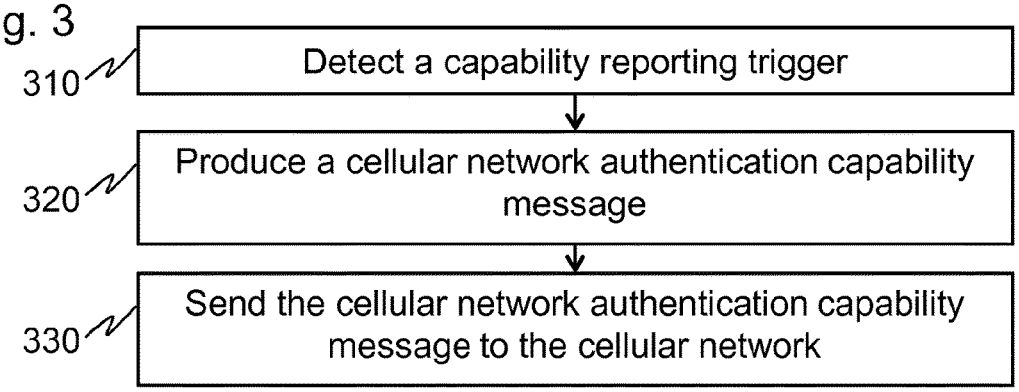
FIG. 3 shows a flow chart of a process according to an example embodiment of the invention.

FIG. 3 shows a flow chart of a process according to an example embodiment of the invention. The process comprises:

detecting 310 any capability reporting trigger and responsively to such determination:

producing 320 a cellular network authentication capabilities message indicative of cellular network authentication capabilities available for the terminal; and transmitting 330 the cellular network authentication capabilities message to the cellular network.

In an example embodiment, it is a capability reporting trigger that the cellular terminal is about to send one or more of: an attach request message; a tracking area update request; and a routing area update request.

In an example embodiment, the process comprises receiving from the cellular network a capability request message for authentication capabilities. The receiving of the capability request message may form a capability reporting trigger.

In an example embodiment, the security entity is configured to form content for the capabilities message. In an example embodiment, the security entity is configured to receive a request for the content for the capabilities message and to responsively produce the content for the capabilities message. In an example embodiment, the security entity is configured to receive an authentication request and to respectively produce the content for the capabilities message.

In an example embodiment, the processor of the cellular terminal is configured to perform authentication related communications in a non-access stratum, NAS, layer.

In an example embodiment, the cellular terminal is configured to receive an update command and to responsively update the security entity. In an example embodiment, the cellular terminal is configured to update the security entity to support an earlier unsupported cellular authentication algorithm.

In an example embodiment, the capabilities message is contained within another cellular network authentication message that is produced by the cellular terminal for the cellular network. In an example embodiment, the capabilities message is conveyed using a set of bits of an authentication management field, AMF, in an authentication token, AUTN.

In an example embodiment, the capabilities message is contained within an authentication failure message.

In an example embodiment, the capabilities message is contained within an authentication response message.

In an example embodiment, the selected cryptographic algorithm employs a cipher key, OK. The cipher key may consist of 64 bits, 128 bits or 256 bits.

In an example embodiment, the selected cryptographic algorithm employs an integrity key, IK. The integrity key may consist of 64 bits, 128 bits or 256 bits.

In an example embodiment, the selected cryptographic algorithm employs a response parameter, RES. The response parameter may consist of 32 bits, 64 bits, 128 bits or 256 bits.

In an example embodiment, the authentication request message 24 is an extended authentication request message. In an example embodiment, the extended authentication request comprises a message type indication that is configured to cause legacy terminals to neglect the extended authentication request message.

In an example embodiment, the extended authentication request comprises a field configured to accommodate a 256 bit authentication token, AUTN.

In an example embodiment, the authentication request message 24 is an updated authentication request. In an example embodiment, the updated authentication request comprises an identifier for indicating which cryptographic algorithm is being used for the authentication. In an example embodiment, the identifier is a new field in addition to those in the normal authentication request. In an example embodiment, the normal authentication request complies with 3GPP TS 24.301 or 3GPP TS 24.008. In an example embodiment, the identifier is contained in one or more bits of the authentication management field, AMF.

In an example embodiment, the authentication request message 24 comprises a protocol discriminator. In an example embodiment, the authentication request message comprises a security header type. In an example embodiment, the authentication request message comprises a non-access stratum key set identifier. In an example embodiment, the authentication request message comprises a spare half octet. In an example embodiment, the authentication request message comprises a challenge, RAND (e.g. evolved packet system, EPS, challenge). In an example embodiment, the authentication request message comprises an authentication token, AUTN. In an example embodiment, the authentication token comprises an authentication management field, AMF. The authentication management field may comprise a parameter indicating the bit-length of TUAK to be used.

In an example embodiment, the message type of the updated authentication request matches with that of the normal authentication request message. In an example embodiment, the updated authentication request comprises a 256 bit authentication token field. The updated authentication request may comprise a 256 bit authentication token field only if a 256 bit authentication token is being used. Otherwise, the updated authentication request may comprise a 128 bit authentication token field.

In an example embodiment, the authentication token comprises 128 bits, 192 bits, 256 bits or 320 bits. In an example embodiment, the authentication token consists of 128 bits, 192 bits, 256 bits or 320 bits. In case that the authentication token is more than 256 bits, excess bits may be discarded.

In an example embodiment, the authentication token comprises a sequence number, SQN. In an example embodiment, the sequence number consists of 48 bits.

In an example embodiment, the authentication token comprises an anonymity key, AK. In an example embodiment, the anonymity key consists of 48 bits.

In an example embodiment, the authentication token comprises an authentication management field, AMF. In an example embodiment, the authentication management field consists of 16 bits. In an example embodiment, the authentication management field comprises 7 spare bits. In an example embodiment, the spare bits are used to indicate cryptography adaptation information. In an example embodiment, the cryptography adaptation information comprises lengths of different cryptography parameters.

In an example embodiment, the authentication token comprises a challenge, RAND. In an example embodiment, the challenge consists of 128 bits.

In an example embodiment, the decoding the authentication request message 24 to a decoded authentication request is performed according to the selected cryptographic algorithm and based on a shared secret known by the cellular terminal and a network operator of the cellular terminal.

In an example embodiment, the process comprises, based on the decoded authentication request, the shared secret and the selected cryptographic algorithm, producing and encrypting the authentication response message 25.

In an example embodiment, the authentication response message 25 comprises a message type indication. In an example embodiment, the message type indication identifies the authentication response message as an extended authentication response message. In an example embodiment, the message type indication matches with that of a normal authentication response message. In an example embodiment, the message type indication of the normal authentication response message complies with 3GPP TS 24.301.

In an example embodiment, the extended authentication response message comprises a variable length authentication response parameter, RES. In an example embodiment, the authentication response parameter has a length selected from a group consisting of any one or more of: 32 bits, 64 bits, 128 bits or 256 bits.

In an example embodiment, the authentication response message 25 is provided with a new information element in comparison the normal authentication response message. In an example embodiment, the new information element is configured to accommodate a 128 bit or a 256 bit authentication response parameter.

In an example embodiment, the authentication response message 25 comprises an extended authentication response parameter field that is configured to accommodate a 128 bit or a 256 bit authentication response parameter.

In an example embodiment, the authentication response message 25 comprises a cryptography algorithm indication.

Figure 4:
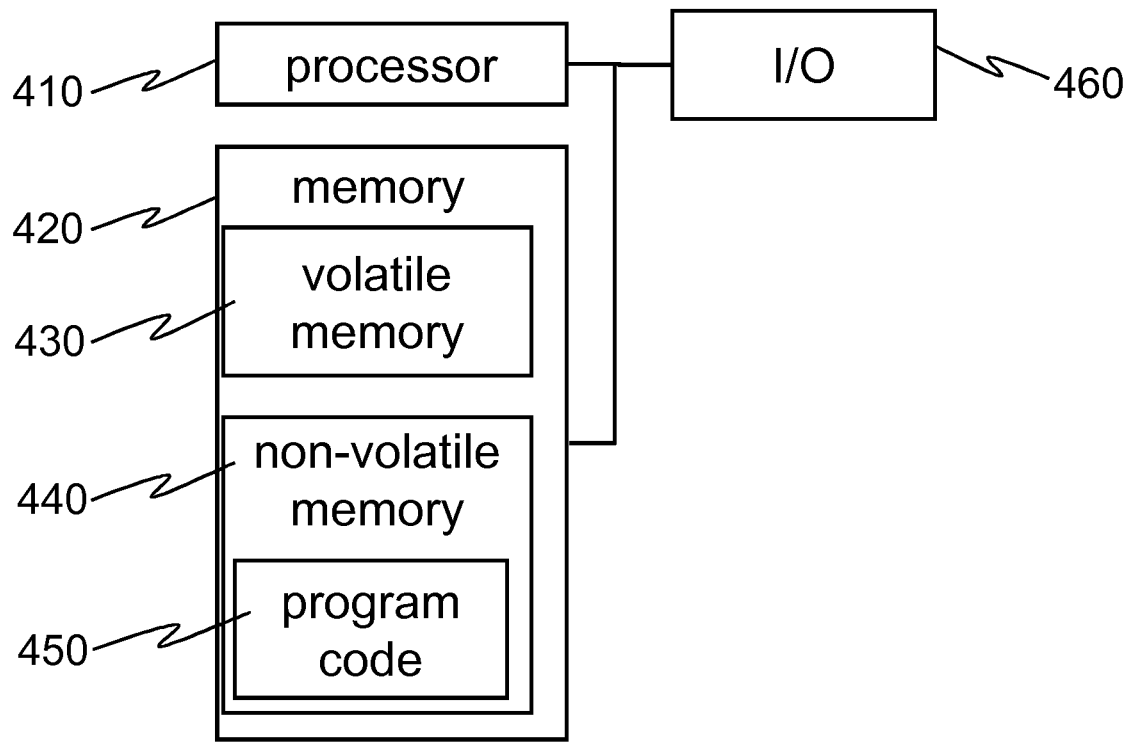
FIG. 4 shows a block diagram of an apparatus of an example embodiment.

FIG. 4 shows an example block diagram of an apparatus 400 according to an example embodiment. The apparatus 400 comprises a memory 420 that comprises a volatile memory 430 and a non-volatile memory 440 that is configured to store computer programs or software comprising computer program code 450. The apparatus 400 further comprises at least one processor 410 for controlling the operation of the apparatus 400 using the computer program code 450 and an input/output system 460 for communicating with other entities or apparatuses. Accordingly, the input/output system 460 comprises one or more communication units or modules providing communication interfaces towards other entities and/or apparatuses. In an example embodiment, the processor 410 is configured to run the program code 450 in the volatile memory 430. In an example embodiment, the apparatus 400 is configured to operate as the MME 220.

The processor 410 comprises, for example, any one or more of: a master control unit (MCU); a microprocessor; a digital signal processor (DSP); an application specific integrated circuit (ASIC); a field programmable gate array; and a microcontroller.

Figure 5:
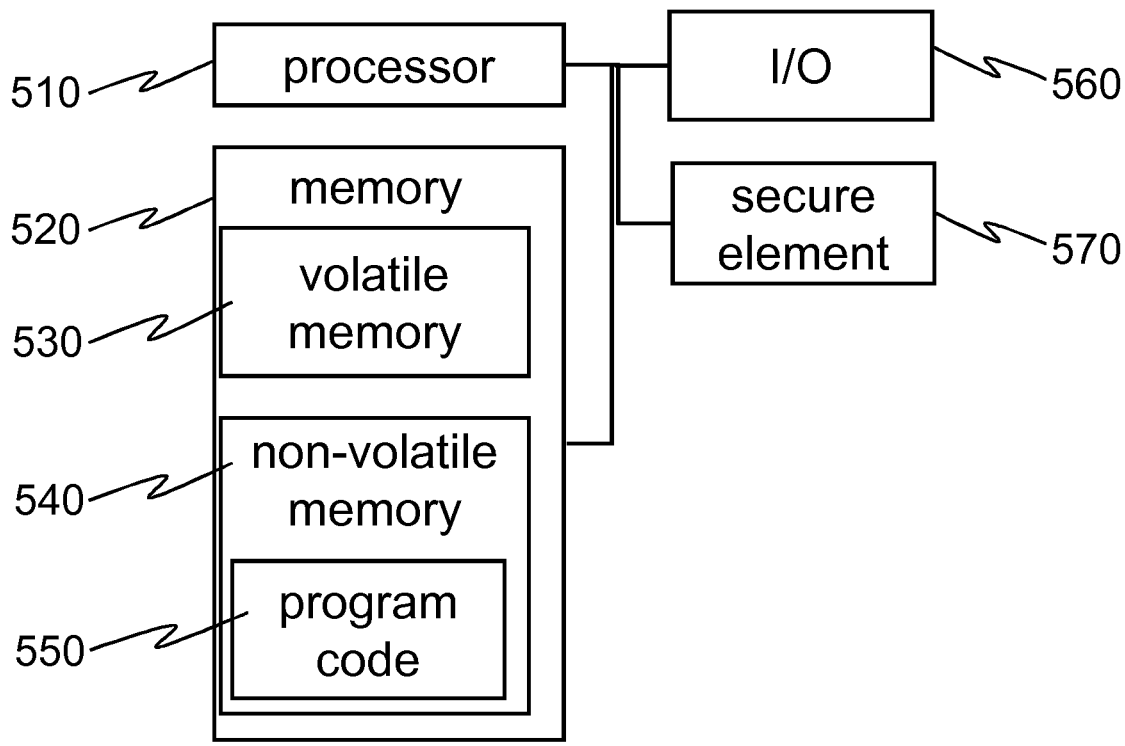
FIG. 5 shows a block diagram of an apparatus of an example embodiment.

FIG. 5 shows an example block diagram of an apparatus 500 according to an example embodiment. The apparatus 500 comprises a memory 520 that comprises a volatile memory 530 and a non-volatile memory 540 that is configured to store computer programs or software comprising computer program code 550. The apparatus 500 further comprises at least one processor 510 for controlling the operation of the apparatus 500 using the computer program code 550. The apparatus 500 further comprises an input/output system 560 for communicating with other entities or apparatuses. Accordingly, the input/output system 560 comprises one or more communication units or modules providing communication interfaces towards other entities and/or apparatuses. The apparatus 500 further comprises a secure element (SE) 570 secure element that contains one or more network access applications such as SIM(s) or USIM(s). In an example embodiment, the SE 570 is an application that is hosted by a secure element which is implemented as software. In another example embodiment, the secure element 570 comprises a universal integrated circuit card, UICC. In an example embodiment, the processor 510 is configured to run the program code 550 in the volatile memory 530. In an example embodiment, the apparatus 500 is configured to operate as the cellular terminal 100.

The processor 510 comprises, for example, any one or more of: a master control unit (MCU); a microprocessor; a digital signal processor (DSP); an application specific integrated circuit (ASIC); a field programmable gate array; and a microcontroller.

Without in any way limiting the scope, interpretation, or application of the claims appearing below, a technical effect of one or more of the example embodiments disclosed herein is that cellular networks may be allowed to develop by their authentication features to a greater extent using existing equipment or in other words, that the life span of existing equipment may be increased and/or the security of cellular networks may be enhanced. Another technical effect of one or more of the example embodiments disclosed herein is that reliability issues may be avoided or mitigated with relation to cellular authentication procedures. Another technical effect of one or more of the example embodiments disclosed herein is that the capability information may be transferred with little changes in the existing cellular networks. For example, the AUTN may consist of SQN, AK, AMF and MAC. The sequence number SQN (separate instance) may be stored in the HLR/HSS for all subscribers. In such a case, adding bits to SQN might have large or even critical impacts to the HLR/HSS. AMF field, on the contrary, may be better suited a field for carrying authentication capability information. AMF may also be better suited for this function than the AK field or the MAC field the change of which might cause severe and/or wide impact on operator network as a whole.

Embodiments of the present invention may be implemented in software, hardware, application logic or a combination of software, hardware and application logic. In an example embodiment, the application logic, software or an instruction set is maintained on any one of various conventional computer-readable media. In the context of this document, a "computer-readable medium" may be any non-transitory media or means that can contain, store, communicate, propagate or transport the instructions for use by or in connection with an instruction execution system, apparatus, or device, such as a computer, with one example of a computer described and depicted in FIG. 4 or 5. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the before-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the foregoing describes example embodiments of the invention, these descriptions should not be viewed in a limiting sense. Rather, there are several variations and modifications which may be made without departing from the scope of the present invention as defined in the appended claims.

What is claimed is:

1. A method in a cellular terminal comprising:
   detecting, with the cellular terminal, a trigger for capability reporting with the cellular terminal;
   in response to determining the capability reporting required for the detected trigger, producing, with the cellular terminal, a cellular network authentication capabilities message indicative of cellular network authentication capabilities available for the cellular terminal; and
   transmitting, with the cellular terminal, the cellular network authentication capabilities message to a cellular network, wherein the capabilities message is conveyed using a set of bits of an authentication management field in an authentication token.

2. The method of claim 1, comprising receiving from the cellular network a capability request message for the cellular network authentication capabilities.

3. The method of claim 1, wherein the cellular terminal comprises a secure element.

4. The method of claim 3, wherein the secure element is configured for computation of authentication key management for cellular authentication.

5. The method of claim 3, wherein the secure element is configured to form content for the capabilities message.

6. The method of claim 5, wherein the secure element is configured to receive a request for the content for the capabilities message and to responsively produce the content for the capabilities message.

7. The method of claim 5, wherein the secure element is configured to receive an authentication request and to respectively produce the content for the capabilities message.

8. The method of claim 3, wherein the secure element is a software-based entity.

9. The method of claim 3, wherein the cellular terminal is configured to receive an update command and to responsively update the secure element.

10. The method of claim 9, wherein the cellular terminal is configured to update the secure element to support an earlier unsupported cellular authentication algorithm.

11. The method of claim 1, wherein the capabilities message is contained within another cellular network authentication message that is produced with the cellular terminal for the cellular network.

12. The method of claim 1, wherein the capabilities message is contained within an authentication failure message.

13. The method of claim 1, wherein the capabilities message is contained within an authentication response message.

14. The method of claim 1, wherein the cellular terminal is configured to support any one or more of a plurality of cryptographic algorithms for cellular authentication.

15. The method of claim 14, wherein the cryptographic algorithms is selected from a group consisting of
MILENAGE;
128 bit TUAK; and
256 bit TUAK.

16. An apparatus comprising:
at least one processor;
at least one non-transitory memory including computer program code, the at least one non-transitory memory and the computer program code configured to, with the at least one processor, cause the apparatus at least to:
detect, with a cellular terminal, a trigger for capability reporting with the apparatus;
in response to determining the capability reporting required for the detected trigger, produce, with the cellular terminal, a cellular network authentication capabilities message indicative of cellular network authentication capabilities available for the cellular terminal; and
transmit, with the cellular terminal, the cellular network authentication capabilities message to a cellular network, wherein the capabilities message is conveyed using a set of bits of an authentication management field in an authentication token.

17. A computer program embodied on a non-transitory computer-readable storage medium storing computer-readable code, which, when executed with at least one processor, causes the at least one processor to perform:
detect, with a cellular terminal, a trigger for capability reporting with a cellular terminal;
in response to determining the capability reporting required for the detected trigger, produce, with the cellular terminal, a cellular network authentication capabilities message indicative of cellular network authentication capabilities available for the cellular terminal; and
transmit, with the cellular terminal, the cellular network authentication capabilities message to a cellular network, wherein the capabilities message is conveyed using a set of bits of an authentication management field in an authentication token.

18. The apparatus of claim 16, wherein the at least one non-transitory memory and the computer program code are further configured to, with the at least one processor, cause the apparatus at least to:
receive from the cellular network a capability request message for the cellular network authentication capabilities, wherein the capability request message comprises an identifier of a cryptographic algorithm used by the cellular network.

19. The apparatus of claim 16, wherein the cellular network authentication capabilities message comprises an indication of a cryptography algorithm, wherein the indication of the cryptography algorithm is indicative of the network authentication capabilities available for the apparatus.

* * * * *